United States Patent [19]

Yoshino et al.

[11] 4,282,288
[45] Aug. 4, 1981

[54] GRAPHITE REFRACTORY ARTICLE HAVING DENSE STRUCTURE WITH LOW POROSITY

[75] Inventors: Shigeo Yoshino; Tadashi Zenbutsu; Hajime Asami, all of Bizen; Miki Suma, Niiza, all of Japan

[73] Assignees: Shinagawa Shirorenga Kabushiki Kaisha; Toshin Seiko Kabushiki Kaisha, both of Tokyo, Japan

[21] Appl. No.: 91,487

[22] Filed: Nov. 5, 1979

[30] Foreign Application Priority Data

Dec. 5, 1978 [JP] Japan .................. 53-149661

[51] Int. Cl.³ ................................. B32B 9/00
[52] U.S. Cl. ...................... 428/408; 428/524; 423/448; 106/56; 260/38
[58] Field of Search .............. 428/408, 524, 538, 539, 428/304, 316

[56] References Cited

U.S. PATENT DOCUMENTS

| | | | |
|---|---|---|---|
| 1,566,409 | 12/1925 | Lavene | 428/408 |
| 2,216,493 | 10/1940 | Kiefer | 428/408 |
| 2,224,724 | 12/1940 | Elsey | 428/408 |
| 2,282,235 | 5/1942 | Moberly | 428/408 |
| 3,206,327 | 9/1965 | Diefendorf | 428/408 |
| 3,433,682 | 3/1969 | Kalnin | 428/408 X |
| 4,067,956 | 1/1978 | Franklin et al. | 428/408 X |

*Primary Examiner*—William R. Dixon, Jr.
*Attorney, Agent, or Firm*—Frishauf, Holtz, Goodman & Woodward

[57] ABSTRACT

A graphite refractory article having a dense structure with a low porosity, which has a chemical composition consisting essentially of:
  100 wt. parts of natural flake graphite, as the carbonaceous raw material, comprising at least 70 wt. % flake graphite having a particle size within the range of from 0.1 to 3 mm and up to 30 wt. % flake graphite having a particle size of under 0.1 mm; from 4 to 10 wt. parts of powdery phenol resin as the binder; and, incidental impurities;
  said graphite refractory article being obtained by press-forming a dry mixture having said chemical composition under a forming pressure of from 700 to 2,000 kg/cm² applied in one direction to prepare a formed body, and heating the resultant formed body;
  said graphite refractory article being imparted, through said press forming and said heating, a structure in which the flakes of said natural flake graphite are orderly arranged in substantially one direction into layers, and an apparent porosity of up to 15%; and,
  said graphite refractory article may also contain up to 10 wt. parts in total of at least one constituent selected from the group consisting of alumina, magnesia, silicon carbide, coke, zircon, silicon, phosphate and borate.

7 Claims, 2 Drawing Figures

GRAPHITE REFRACTORY ARTICLE HAVING DENSE STRUCTURE WITH LOW POROSITY

FIELD OF THE INVENTION

The present invention relates to a graphite refractory article having a dense structure with a low porosity, manufactured using natural flake graphite as the carbonaceous raw material.

BACKGROUND OF THE INVENTION

One of the conventionally known methods for manufacturing a graphite refractory article comprises: mixing and kneading a carbonaceous raw material such as a petroleum coke and an anthracite, and a binder such as coal tar and coal pitch, to prepare a wet or plastic mixture; applying press forming or extrusion forming to said mixture to obtain a formed body having a prescribed shape; and, applying firing at a high temperature of at least 2,000° C. or electrical resistance heating at a high temperature of at least 2,000° C. to said formed body, to convert said carbonaceous raw material into graphite (hereinafter referred to as the "prior art (1)").

However, the prior art (1), which requires a long period of time and a huge amount of heat energy for converting the carbonaceous raw material into graphite, is very low in efficiency.

Another method for manufacturing a graphite refractory article is known, which comprises: mixing and kneading from about 83 to about 87 wt.% natural flake graphite as the carbonaceous raw material and a binder such as coal tar and coal pitch to prepare a wet or plastic mixture; applying press forming or extrusion forming to said mixture to obtain a formed body having a prescribed shape; and, baking or firing said formed body (hereinafter referred to as the "prior art (2)").

In the prior art (2), which employs natural flake graphite as the carbonaceous raw material, it is not necessary to consume heat energy for converting the carbonaceous raw material into graphite as in the prior art (1). However, the structure of the graphite refractory article manufactured by the prior art (2), being composed of the flakes of natural flake graphite non-directionally overlapping one on top of the other at random, has a high porosity and is not dense. In addition, in the prior art (2), if the forming pressure to make a formed body is increased in an attempt to manufacture a graphite refractory article having a dense structure with a low porosity, the characteristics inherent in the natural flake graphite such as the flat shape and slipperiness cause such defects as laminations and cracks in the formed body. Because of the forming pressure thus limited of the formed body in the prior art (2), it is difficult to manufacture a graphite refractory article having a dense structure with a low porosity.

Both in the prior arts (1) and (2), the binder such as coal tar and coal pitch is used in a large quantity for rendering a mixture wet or plastic, and this leads to volatilization of large quantities of volatile matter when baking or firing a formed body. As a result, the manufactured graphite refractory article has a high porosity, and therefore problems arise in service because of low oxidation resistance, thermal conductivity and erosion resistance against molten slag, molten pig iron and molten steel.

For the purpose of solving the above-mentioned problems associated with porosity, a method for improving porosity was proposed, which comprises: impregnating a baked or fired formed body with a pitch or a resin having a high carbon content to fill pores in the formed body with the pitch or the resin, and baking or firing again said formed body to convert the pitch or the resin in the pores into carbon or graphite. According to this method, the manufactured graphite refractory article has a lower porosity, whereas the complicated processes require a long period of time for manufacture of the graphite refractory article, thus leading to higher costs.

Under such circumstances, there is a demand for the development of a graphite refractory article having a dense structure with a low porosity, manufactured with the use of natural flake graphite as the carbonaceous raw material, but a graphite refractory article provided with such properties is not as yet developed.

SUMMARY OF THE INVENTION

An object of the present invention is therefore to provide a graphite refractory article having a dense structure with a low porosity.

Another object of the present invention is to provide a graphite refractory article which is almost free of such defects as laminations and cracks and excellent in oxidation resistance, thermal conductivity and erosion resistance against molten slag, molten pig iron and molten steel.

In accordance with one of the features of the present invention, there is provided a graphite refractory article having a dense structure with a low porosity, which has a chemical composition consisting essentially of:

100 wt. parts of natural flake graphite, as the carbonaceous raw material, comprising at least 70 wt.% flake graphite having a particle size within the range of from 0.1 to 3 mm and up to 30 wt.% flake graphite having a particle size of under 0.1 mm;

from 4 to 10 wt. parts of powdery phenol resin as the binder; and incidental impurities;

said graphite refractory article being obtained by press-forming a dry mixture having said chemical composition under a forming pressure of from 700 to 2,000 kg/cm² applied in one direction to prepare a formed body, and heating the resultant formed body;

said graphite refractory article being imparted, through said press forming and said heating, a structure in which the flakes of said natural flake graphite are orderly arranged in substantially one direction into layers, and an apparent porosity of up to 15%; and, said graphite refractory article may also contain up to 10 wt. parts in total of at least one constituent selected from the group consisting of alumina, magnesia, silicon carbide, coke, zircon, silicon, phosphate and borate salts.

DETAILED DESCRIPTION OF PREFERRED EMBODIMENTS

Figure 2:

With a view to developing a graphite refractory article having a dense structure with a low porosity and excellent in oxidation resistance, thermal conductivity and erosion resistance against molten slag, molten pig iron and molten steel, by solving the above-mentioned problems involved in the conventional graphite refractory articles, we carried out extensive studies, and as a result, we obtained the following findings:

(1) It is not easy to reduce porosity of a graphite refractory article manufactured with the use of natural flake graphite as the carbonaceous raw material, because natural flake graphite is flat in shape and slippery. More particularly, the flakes of graphite non-directionally overlapping one on top of the other at random, which lead to an insufficient deaeration during press forming, make it impossible to obtain a dense structure with a low porosity. The structure of a graphite refractory article, as shown in FIG. 2, composed of the flakes of natural flake graphite non-directionally overlapping one on top of the other at random is usually known as the "card-house structure" in the refractory industry because the structure looks like a house made by leaning cards against each other. On the other hand, when the forming pressure to make a formed body is increased in an attempt to manufacture a graphite refractory article having a dense structure with a low porosity, the characteristics inherent in natural flake graphite such as the flat shape and slipperiness cause such defects as laminations and cracks in the formed body. The forming pressure of the formed body cannot therefore be increased to over 700 kg/cm$^2$, and consequently, it is impossible to obtain a graphite refractory article having a dense structure with a low porosity.

Figure 1:
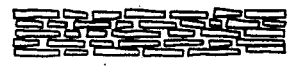
FIG. 1 is a schematic representation illustrating the arrangement of the card-pack structure of a graphite refractory article manufactured with the use of natural flake graphite as the carbonaceous raw material; and, FIG. 2 is a schematic representation illustrating the arrangement of the card-house structure of a graphite refractory article manufactured with the use of natural flake graphite as the carbonaceous raw material.

(2) When the formed body is imparted a structure in which the flakes of natural flake graphite are orderly arranged in one direction into layers, a satisfactory deaeration can be achieved during press forming, and furthermore, increasing the forming pressure of the formed body to over 700 kg/cm$^2$ does not cause such defects as laminations and cracks in the formed body. It is thus possible to effect a high-pressure press forming under a pressure of at least 700 kg/cm$^2$ and obtain a graphite refractory article having a dense structure with a low porosity. The structure of a graphite refractory article, as shown in FIG. 1, composed of the flakes of graphite orderly arranged in substantially one direction into layers is usually known as the "card-pack structure" in the refractory industry because the structure looks like a pile of cards.

(3) Use of a wet or plastic mixture, as in the conventional manufacture of a graphite refractory article, results in the card-house structure of the formed body, not in the card-pack structure.

(4) On the contrary, use of a dry mixture for manufacturing a graphite refractory article permits achievement of the card-pack structure of the formed body. More specifically, the flakes of natural flake graphite are orderly arranged in one direction substantially at right angles to the pressing direction into layers by press-forming a dry mixture in one direction. In contrast to this, forming of a dry mixture into a formed body by a method other than the one-direction press forming, for example extrusion forming, rubber press forming or vibration forming, does not allow achievement of a formed body with the card-pack structure. The method of forming should therefore be limited to press forming in one direction.

(5) Since a formed body with the card-pack structure can be obtained by press-forming a dry mixture in one direction as described above, it is possible to effect high-pressure forming under a pressure of at least 700 kg/cm$^2$ without causing such defects as laminations and cracks, and therefore to obtain a graphite refractory article, almost free of such defects as laminations and cracks, having a dense structure with a low porosity.

The present invention was made on the basis of the above-mentioned findings, and a graphite refractory article having a dense structure with a low porosity of the present invention is characterized by:

having a chemical composition consisting essentially of:
- 100 wt. parts of natural flake graphite, as the carbonaceous raw material, comprising at least 70 wt.% flake graphite having a particle size within the range of from 0.1 to 3 mm and up to 30 wt.% flake graphite having a particle size of under 0.1 mm;
- from 4 to 10 wt. parts of powdery phenol resin as the binder; and
- incidental impurities;

said graphite refractory article being obtained by press-forming a dry mixture having said chemical composition under a forming pressure of from 700 to 2,000 kg/cm$^2$ applied in one direction to prepare a formed body, and heating the resultant formed body; and, said graphite refractory article being imparted, through said press forming and said heating, a structure in which the flakes of said natural flake graphite are orderly arranged in substantially one direction into layers, and an apparent porosity of up to 15%.

The natural flake graphite used as the carbonaceous raw material in the present invention may be the natural flake graphite of an ordinary quality, such as those produced in Madagascar, the USSR and China, having a fixed carbon content of at least 80 wt.%. The particle size distribution of natural flake graphite should be such that natural flake graphite contains at least 70 wt.% flake graphite having a particle size within the range of from 0.1 to 3 mm and up to 30 wt.% flake graphite having a particle size of under 0.1 mm. If the amount of flake graphite having a particle size of under 0.1 mm is at least 30 wt.%, large quantities of the flake graphite having a small particle size of under 0.1 mm fill gaps between the large flakes of flake graphite, and this causes the structure of the formed body to become an undesirable card-house structure, not a desirable card-pack structure. On the other hand, use of flake graphite having a particle size of over 3 mm does not exert an adverse effect on the quality of the graphite refractory article manufactured, but the production of flake graphite having a particle size of over 3 mm is limited, thus resulting in a higher price, and hence in higher costs.

In the present invention, a powdery phenol resin of the novolak type or the resol type is added as the binder in an amount of from 4 to 10 wt. parts against 100 wt.

parts of the above-mentioned natural flake graphite. Use of a dry binder in such a relatively small amount is one of the important features of the present invention. Because, with an amount of added powdery phenol resin of under 4 wt. parts, a desired strength of the formed body cannot be obtained, not only smooth handling of the formed body cannot be ensured, but also the manufactured graphite refractory article tends to have such defects as corner breakage. With an amount of added powdery phenol resin of over 10 wt. parts, on the other hand, volatilization of large quantities of volatile matters during baking or firing of the formed body results in a higher porosity of the manufactured graphite refractory article, thus making it impossible to ensure satisfactory oxidation resistance, thermal conductivity and erosion resistance against molten slag, molten pig iron and molten steel.

The natural flake graphite and the powdery phenol resin mentioned above are sufficiently mixed and kneaded by a conventionally known mixer such as the V-shaped mixer, the diamond type mixer and the V-vertical type mixer to prepare a dry and fluid mixture. Use of a dry and fluid mixture as mentioned above is one of the important features of the present invention.

In order to uniformly disperse the powdery phenol resin among the flakes of the natural flake graphite when mixing and kneading the natural flake graphite and the powdery phenol resin, it is desirable that the powdery phenol resin has a particle size of up to 0.15 mm. Use of natural flake graphite, the flake surfaces of which are wetted by a wetting agent such as methyl alcohol, ethyl alcohol and other alcohol or an alcohol-water solution, or use of natural flake graphite, the flake surfaces of which are coated with a phenol resin solution and then dried, improves get-to-fit property of the powdery phenol resin with natural flake graphite, thus effectively promoting uniform dispersion of the powdery phenol.

In the present invention, at least one of alumina, magnesia, silicon carbide, coke and zircon is added as required to further improve compressive strength or erosion resistance of the graphite refractory article, and/or at least one of silicon, phosphate and borate salts is added as required to further improve oxidation resistance of same. The total amount of these additives should be up to 10 wt. parts against 100 wt. parts of natural flake graphite. When the total amount of these additives is over 10 wt. parts, large quantities of these additives fill gaps between the flakes of natural flake graphite, thus causing the structure of the formed body to become an undesirable card-house structure, not a desirable card-pack structure. These additives are mixed and kneaded, together with the natural flake graphite and the powdery phenol resin mentioned above, by a mixer.

A formed body having a prescribed shape is obtained by press-forming the mixture prepared as mentioned above in one direction under a forming pressure of from 700 to 2,000 kg/cm². Under the above-mentioned forming pressure, the mixture is compressed from a bulk specific gravity of from 0.3 to 0.5 to a bulk specific gravity of at least 2. The formed body thus obtained has a dense card-pack structure almost free of such defects as laminations and cracks. However, a forming pressure of under 700 kg/cm² cannot give a formed body having a satisfactory card-pack structure, thus making it impossible to obtain a graphite refractory article having an apparent porosity of up to 15%. With a forming pressure of over 2,000 kg/cm², on the other hand, no particular effect cannot be obtained. As is generally known, a graphite refractory article with a protecting steel sheet, which has a further excellent oxidation resistance, can be obtained by press-forming the mixture together with the protecting steel sheet.

A graphite refractory article having an apparent porosity of up to 15%, suitable for uses in wall and bottom of a vessel such as a blast furnace, an oxygen-top-blowing converter, an open-hearth furnace, an electric arc furnace and a ladle is manufactured by baking at a temperature of from about 150° to about 500° C., or firing at a temperature of from about 1,000° to about 1,500° C. the formed body prepared as mentioned above.

Now, the graphite refractory article of the present invention is described more in detail by means of an example while comparing with the conventional graphite refractory articles.

EXAMPLE

Graphite refractory articles within the scope of the present invention (hereinafter referred to as the "refractories of the present invention") Nos. 1 to 3, and graphite refractory articles outside the scope of the present invention (hereinafter referred to as the "reference refractory No. 1") were prepared by forming a formed body having dimensions of 230 mm × 114 mm × 65 mm, having a chemical composition as shown in Table 1, through the one-direction press forming of a mixture under a forming pressure of 1,200 kg/cm². For comparison purposes, in addition, a commercially available round bar-shaped electrode for electric arc furnace outside the scope of the present invention having a chemical composition as shown in Table 1 (hereinafter referred to as the "reference refractory No. 2") was procured.

The reference refractory No. 1 is a graphite refractory article prepared by forming a formed body through press forming of a plastic mixture comprising natural flake graphite as the carbonaceous raw material and coal tar as the binder, and firing the resultant formed body, and corresponds to the prior art (2) previously mentioned under the heading of the "BACKGROUND OF THE INVENTION". The reference refractory No. 2 is a graphite refractory article prepared by applying extrusion forming to a plastic mixture comprising petroleum coke as the carbonaceous raw material and coal pitch as the binder to obtain a formed body, and firing the resultant formed body to convert said carbonaceous raw material into graphite, and corresponds to the prior art (1) previously described under the heading of the "BACKGROUND OF THE INVENTION".

The particle size distribution of natural flake graphite used in the refractories of the present invention Nos. 1 to 3 and the reference refractory No. 1 was as shown in Table 2. The reference refractory No. 2, not using natural flake graphite, is not given in Table 2.

TABLE 1

| | Blending ratio (wt. part) | | | | |
| --- | --- | --- | --- | --- | --- |
| | Refractory of the present invention No. | | | Reference refractory No. | |
| Raw material | 1 | 2 | 3 | 1 | 2 |
| Natural flake graphite (fixed carbon: 90 wt. %) | 100 | 100 | 100 | 100 | — |

TABLE 1-continued

| Raw material | Blending ratio (wt. part) | | | | |
|---|---|---|---|---|---|
| | Refractory of the present invention No. | | | Reference refractory No. | |
| | 1 | 2 | 3 | 1 | 2 |
| Phenol resin | | | | | |
| Novolak type (particle size up to 0.15 mm) | 4.2 | 6.7 | — | — | — |
| Resol type (particle size up to 0.15 mm) | — | — | 9.9 | — | — |
| Silicon carbide (particle size up to 0.3 mm) | — | 4.4 | — | — | — |
| Coal tar | — | — | — | 20.5 | — |
| Petroleum coke | — | — | — | — | 100 |
| Coal pitch | — | — | — | — | 17–43 |

TABLE 2

| Size distribution of natural flake graphite (mm) | Refractory of the present invention No. | | | Reference refractory No. |
|---|---|---|---|---|
| | 1 | 2 | 3 | 1 |
| 1.0 min. | — | — | 82 wt. % | — |
| from 0.1 to under 1.0 | 96 wt. % | 93 wt. % | 16 wt. % | 60 wt. % |
| Under 0.1 | 4 wt. % | 7 wt. % | 2 wt. % | 40 wt. % |

As is clear from Tables 1 and 2, the reference refractory No. 1 is outside the scope of the present invention in that the mixture is plastic because of the use of coal tar as the binder in such a large amount as 20.5 wt. parts against 100 wt. parts of natural flake graphite as the carbonaceous raw material, and that the ratio of natural flake graphite having a particle size of under 0.1 mm is so large as 40 wt.%. The reference refractory No. 2 is outside the scope of the present invention in that natural flake graphite is not used as the carbonaceous raw material, and that the mixture is plastic because of the use of coal pitch as the binder in such a large amount as from 17 to 43 wt. parts against 100 wt. parts of petroleum coke as the carbonaceous raw material.

Then, bulk specific gravity, apparent porosity (%), compressive strength (kg/cm$^2$), oxidation resistance (wt.%), erosion resistance against molten steel (wt.%) and longitudinal thermal conductivity (Kcal/m hr°C.) were measured on the refractories of the present invention Nos. 1 to 3 and the reference refractories Nos. 1 and 2. Oxidation resistance was evaluated by cutting test specimens having dimensions of 50 mm × 50 mm × =mm respectively from the refractories of the present invention Nos. 1 to 3 and the reference refractories Nos. 1 and 2, and measuring the weight loss (wt.%) of said test specimens after heating said test specimens at a temperature of 1,000° C. for 2 hours in an oxidizing atmosphere. Erosion resistance against molted steel was evaluated by cutting test specimens having dimensions of 30 mm × 30 mm × 180 mm respectively from the refractories of the present invention Nos. 1 to 3 and the reference refractories Nos. 1 and 2, and measuring the weight loss (wt.%) of said test specimens after immersing said test specimens into a molten steel of a temperature of 1,650° C. for 30 minutes. The results of said measurements are given in Table 3.

TABLE 3

| Property | Refractory of the present invention No. | | | Reference refractory No. | |
|---|---|---|---|---|---|
| | 1 | 2 | 3 | 1 | 2 |
| Bulk specific gravity | 2.00 | 1.95 | 1.95 | 1.65 | 1.62 |
| Apparent porosity (%) | 8.2 | 9.7 | 9.0 | 23.2 | 26.5 |
| Compressive strength (kg/cm$^2$) | 150 | 200 | 200 | 130 | 205 |
| Oxidation resistance (wt. %) | 4 | 5 | 5 | 12 | 10 |
| Erosion resistance against molten steel (wt. %) | 3 | 4 | 6 | 20 | 30 |
| Longitudinal thermal conductivity (Kcal/m hr°C.) | 140 | 135 | 135 | 50 | 100 |

As is evident from the results of measurement given in Table 1, the refractories of the present invention Nos. 1 to 3 have a larger bulk specific gravity and a far smaller apparent porosity as compared with the reference refractories Nos. 1 and 2. Therefore, the refractories of the present invention Nos. 1 to 3 are far superior to the reference refractories Nos. 1 and 2 in any of oxidation resistance, erosion resistance against molten steel and thermal conductivity.

As described above in detail, the graphite refractory article of the present invention is imparted a dense structure in which the flakes of natural flake graphite are orderly arranged in substantially one direction into layers, i.e., a card-pack structure, and furthermore, has a large bulk specific gravity because of the small amount of the binder used, with a very low apparent porosity. According to the present invention, therefore, there is available a graphite refractory article not only excellent in compressive strength, oxidation resistance, erosion resistance against molten slag, molten pig iron and molten steel and thermal conductivity, but also almost free of such defects as laminations and cracks, thus providing industrially useful effects.

What is claimed is:

1. A graphite refractory article having a dense structure with a low porosity, which has a chemical composition consisting essentially of:
   100 wt. parts of natural flake graphite, as the carbonaceous raw material, comprising at least 70 wt.% flake graphite having a particle size within the range of from 0.1 to 3 mm and up to 30 wt.% flake graphite having a particle size of under 0.1 mm;
   from 4 to 10 wt. parts of powdery phenol resin as the binder; and
   incidental impurities;
   said graphite refractory article being obtained by press-forming a dry mixture having said chemical composition under a forming pressure of from 700 to 2,000 kg/cm$^2$ applied in one direction to prepare a formed body, and heating the resultant formed body; and,
   said graphite refractory article being imparted, through said press forming and said heating, a structure in which the flakes of said flake graphite are orderly arranged in substantially one direction into layers, and an apparent porosity of up to 15%.

2. The graphite refractory article as claimed in claim 1, wherein said graphite refractory article also contains up to 10 wt. parts in total of at least one constituent selected (i) from the group consisting of alumina, magnesia, silicon carbide, coke, and zircon, and (ii) from the group consisting of silicon, and phosphate and borate salts.

3. The graphite refractory article as claimed in any of claims 1 and 2, wherein
the flake surfaces of said natural flake graphite in said mixture are wetted by a wetting agent.

4. The graphite refractory article as claimed in any of claims 1 and 2, wherein
the flake surfaces of said natural flake graphite in said mixture are coated with a phenol resin solution, and then dried.

5. The graphite refractory article as claimed in any of claims 1 and 2, wherein
said mixture is press-formed, together with a protecting steel sheet, when press-forming said mixture, whereby at least one surface of said graphite refractory article is covered by said protecting steel sheet.

6. The graphite refractory article as claimed in claim 3, wherein said mixture is press-formed, together with a protecting steel sheet, when press-forming said mixture, whereby at least one surface of said graphite refractory article is covered by said protecting steel sheet.

7. The graphite refractory article as claimed in claim 4, wherein said mixture is press-formed, together with a protecting steel sheet, when press-forming said mixture, whereby at least one surface of said graphite refractory article is covered by said protecting steel sheet.

* * * * *